No. 892,202. PATENTED JUNE 30, 1908.
J. D. WOODS & W. J. YOST.
NUT LOCK.
APPLICATION FILED MAR. 25, 1908.
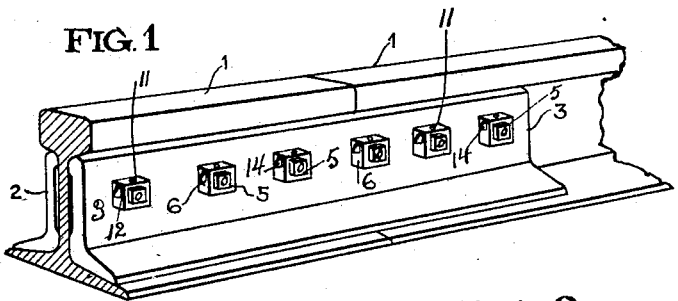
FIG. 1
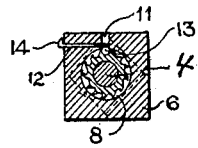
FIG. 3
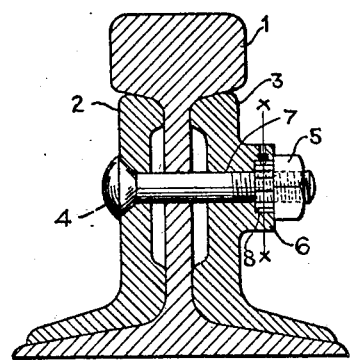
FIG. 2
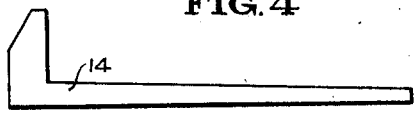
FIG. 4           FIG. 5
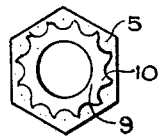   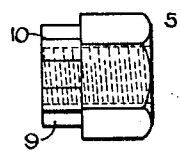
FIG. 6    FIG. 7
FIG. 8    FIG. 9
Witnesses
J. R. Mahaney
X. H. Butler
Inventors
J. D. Woods
W. J. Yost
By H. C. Evert
Attorneys
THE NORRIS PETERS CO., WASHINGTON, D. C.

UNITED STATES PATENT OFFICE.

JOHN D. WOODS AND WILLIAM J. YOST, OF STEUBENVILLE, OHIO.

NUT-LOCK.

No. 892,202.      Specification of Letters Patent.      Patented June 30, 1908.

Application filed March 25, 1908. Serial No. 423,141.

*To all whom it may concern:*

Be it known that we, JOHN D. WOODS and WILLIAM J. YOST, citizens of the United States of America, residing at Steubenville, in the county of Jefferson and State of Ohio, have invented certain new and useful Improvements in Nut-Locks, of which the following is a specification, reference being had therein to the accompanying drawing.

This invention relates to a nut-lock particularly designed for railroad joints, and the primary object of our invention is to provide simple and effective means for securing a nut upon a bolt, whereby the same will not become accidentally disengaged due to any vibrations of the bolt.

A further object of our invention is to provide an inexpensive and durable nut lock that will not injure the bolt in connection with which the lock is used.

With the above and other objects in view, which will readily appear as the invention is better understood, the same consists in the novel construction, combination and arrangement of parts to be presently described and then specifically pointed out in the appended claims.

In the drawings; Figure 1 is a perspective view of a rail joint equipped with our nut lock. Fig. 2 is a cross sectional view of the same. Fig. 3 is a transverse sectional view of the nut lock taken on the line $x$—$x$ of Fig. 2. Fig. 4 is an elevation of a locking pin. Fig. 5 is an end view of the same. Fig. 6 is an end view of a nut constructed in accordance with our invention. Fig. 7 is a side elevation of the same. Fig. 8 is an elevation, partly broken away and partly in section of a magnetized rod, and Fig. 9 is an end view of the same.

In the accompanying drawings, 1 designates rails connected by splice bars 2 and 3 and by bolts 4 and nuts 5. The splice bar 3 is provided upon its outer side with rectangular enlargements 6 having bolt openings 7 formed therein and circular recesses 8. The nuts 5 which screw upon the bolts 4 are provided with sleeves 9 having ratchet teeth 10, said sleeves being interiorly screw threaded similar to the nuts 5. Each enlargement 6 of the splice bar 3 is provided with a vertical opening 11 communicating with the recess 8, and with a horizontal opening 12.

After the nut 5 has been tightened upon the bolt 4 a spherical body or ball 13 is dropped into the opening 11 to engage between two of the ratchet teeth 10 of the sleeve 9, said spherical body or ball 13 extending into the opening 11 and binding the sleeve 9 in the enlargement 6, thereby preventing the nut 5 from rotating upon the bolt 4.

To prevent the spherical body or ball 13 from rising in the opening 11, we use a locking pin 14 which is placed in the opening 12 to close the opening 11 and prevent the ball 13 from becoming accidentally disengaged from the sleeve 9.

When it is desired to remove the nut 5, the pin 14 is withdrawn and a magnetized rod 15 lowered in the opening 11. This rod is provided with a socket 16 into which the ball 13 is attracted by the magnetism of the rod 15.

Our improved nut lock can be used upon the inside or outside of rails and any structure through which a bolt or threaded rod passes.

Our invention is susceptible of such changes as are permissible by the appended claims.

Having now described our invention what we claim as new, is;—

1. In a nut lock, the combination with a splice bar and a plurality of bolts adapted to extend therethrough, of enlargements carried by said bar, said enlargements having recesses formed therein, nuts adapted to screw upon said bolts, ratchet sleeves carried by said nuts for engaging in said recesses, said enlargements each having a plurality of openings formed therein, balls located in some of said openings for engaging said ratchet sleeves, and locking pins mounted in other of said openings for closing the first mentioned openings and preventing said balls from being accidentally displaced.

2. In a nut lock, the combination with a bar and bolts adapted to extend therethrough, of enlargements carried by said bar, nuts adapted to screw upon said bolts, ratchet sleeves carried by said nuts and adapted to protrude into said enlargements, balls mounted in said enlargements for engaging said ratchet sleeves, and locking pins arranged in said enlargements for retaining said balls therein.

In testimony whereof we affix our signatures in the presence of two witnesses.

JOHN D. WOODS.
WILLIAM J. YOST.

Witnesses:
HARRY L. MAY,
HOMER B. WILCOX.